US006388754B1

(12) United States Patent
Nishikawa et al.

(10) Patent No.: US 6,388,754 B1
(45) Date of Patent: May 14, 2002

(54) SHAPE MEASURING SYSTEM AND METHOD

(75) Inventors: Osamu Nishikawa; Yoshinori Yamaguchi; Kiwame Tokai, all of Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/455,455

(22) Filed: Dec. 6, 1999

(30) Foreign Application Priority Data

Dec. 21, 1998 (JP) ............................................ 10-363199

(51) Int. Cl.[7] .............................................. G01B 11/24
(52) U.S. Cl. ................... 356/601; 356/602; 250/559.22
(58) Field of Search ................................ 356/601, 602, 356/603, 612, 614, 622, 623, 3, 4.06, 4.07, 4.09; 250/559.19, 559.22, 559.23, 559.29, 559.31

(56) References Cited

U.S. PATENT DOCUMENTS

| 3,633,987 A | * | 1/1972 | Brooks |
| 4,046,477 A | * | 9/1977 | Kaule |
| 4,111,552 A | * | 9/1978 | Bodlaj ........................ 356/28 |
| 4,874,955 A | * | 10/1989 | Uesugi et al. ............... 356/376 |
| 4,999,681 A | * | 3/1991 | Mader ........................ 356/347 |

FOREIGN PATENT DOCUMENTS

| JP | 59-30233 | 7/1984 |
| JP | 2690673 | 8/1997 |

OTHER PUBLICATIONS

"An new active 3D-Vision system based on rf-modulation interferometry of incoherent light" R. Schwarte et al., SPIE vol. 2588, pp. 126–134, 1995.

"The Emerging Versatility of a Scannerless Range Imager" J. Sackos et al., SPIE vol. 2748, pp. 47–60, 1996.

* cited by examiner

*Primary Examiner*—Hoa Q. Pham
(74) *Attorney, Agent, or Firm*—Oliff & Berridge, PLC

(57) ABSTRACT

A shape measuring system reduced in size and cost and high in the light utilization efficiency, as well as a shape measuring method, are disclosed which can measure the distance up to an object accurately without being influenced by external conditions such as a change in reflectance of the surface of the object. A semiconductor laser emits an intensity-modulated illumination light. A plane sensor detects a combined light of both a reflected light from an object and a reference light and outputs a composite light detection signal. The semiconductor laser also emits an illumination light which is a stationary light not intensity-modulated. At this time, a shutter is closed. The plane sensor detects the reflected light from the object and outputs a detection signal thereof. For the composite light detection signal a distance calculator makes correction for eliminating the influence of reflectance of the object on the basis of a detection signal of a reflected stationary light and thereafter calculates the distance up to the object on the basis of the composite light detection signal after the correction.

19 Claims, 9 Drawing Sheets

SHAPE MEASURING SYSTEM AND METHOD

BACKGROUND OF THE INVENTION

1. Field of the Invention

The present invention relates to a shape measuring system and method wherein an intensity-modulated light is emitted toward an object and the distance up to the object is measured on the basis of a phase difference between the light reflected from the object and the emitted light. Particularly, the present invention is concerned with a shape measuring system of reduced size and cost and a shape measuring method both capable of measuring the distance up to an object accurately and independently of external conditions such as a change in reflectance of the object surface.

2. Description of the Prior Art

As methods for measuring a three-dimensional shape there have been proposed two methods which are a passive method and an active method. The passive method measures the shape of an object without radiating energy to the object, while the active method measures the shape of an object by radiating a certain energy to the object and detecting its reflection.

As an example of the passive method there is known a stereo method which measures distances at plural points up to an object. According to the stereo method, two cameras are disposed at a certain interval and the distance up to an object is determined by triangulation on the basis of a parallax of two images obtained. This method is advantageous in that a remote distance can be measured if only images can be picked up, but involves a serious problem that it is impossible to make a three-dimensional measurement for the whole of a smooth surface free of any pattern. In addition, since it is basically impossible to align the optical axes of two cameras with each other, there has been a drawback that there occurs an area (occlusion) incapable of measuring distance.

As to the active method, a light-stripe method is mentioned as an example of the method which measures distances at plural points up to an object. According to this light-stripe method, a slit light is radiated to an object at a certain angle and the distance up to the object is determined by triangulation on the basis of an image picked up at an angle different from the said radiation angle. This method is characteristic in that a relatively simple construction suffices, but it is required that the slit light be scanned in a very small angular unit, resulting in that the measurement time is long because an image is picked up at every angular unit. For solving this problem there has been proposed a structured light method which utilizes the light-stripe method. According to the structured light method, a pattern of a projection light is coded instead of radiating the slit light many times and it is thereby intended to measure a distance with a reduced number of projections. However, given that the number of samples in the horizontal direction is n, it is necessary that image pick-up be conducted log2 n times (nine times if n=512 points), thus giving rise to the problem that the measurement time becomes longer. Additionally, since it is basically impossible to align the optical axis of a projector and that of an image pick-up device with each other, a drawback has been encountered that there occurs an area (occlusion) incapable of measuring a distance.

In connection with the active method, as an example of the method capable of measuring distances at plural points by one image pick-up, there is known a phase distribution measuring method wherein an intensity-modulated light is radiated to an object and a phase distribution of reflected light is measured.

As examples of conventional phase distribution measuring methods are mentioned methods disclosed in Literature 1, "An article described on pages 126 to 134 of SPIE Vol. 2588 (1995) (A new active 3D-Vision system based on rf-modulation interferometry light)," Japanese Patent No. 2690673, and SPIE Vol. 2748 (1996), pp. 47–59, "The Emerging Versatility of a Scannless Range Imager."

FIG. 10 illustrates the conventional shape measuring system described in Literature 1. This shape measuring system, indicated at 100, comprises a modulation/demodulation signal generator 104 which applies an intensity modulation to light emitted from a light source 101A through a condenser lens 102 to a plane modulator 103 using such a crystal as Pockels cell, a projection lens 106 which projects an intensity-modulated light 105a onto an object 6 planewise, the modulation/demodulation signal generator 104 which applies an intensity demodulation to a reflected light 105b incident on a plane demodulator 108 through a focusing lens 107 after being reflected by the object 6, the plane demodulator 108 using such a crystal as Pockels cell, and a CCD camera 109 which picks up an intensity-demodulated light signal. According to this construction, light emitted from the light source 101A is directed to the plane modulator 103 by the condenser lens 102 and is intensity-modulated in accordance with a signal produced from the modulation/demodulation signal generator 104. Thereafter, the intensity-modulated signal 105a is projected planewise onto the object 6 by the projection lens 106. The reflected light 105b from the object 6 is introduced into the plane demodulator 108 by the focusing lens 107 and is intensity demodulated in accordance with a signal provided from the modulation/demodulation signal generator 104, then is focused on the CCD camera 109. An intensity image picked up by the CCD camera 109 contains a phase information based on the distance up to the object 6. By processing this intensity image with a computer 110 it is possible to obtain distance data of the object 6 at a single pick-up of image.

FIG. 11 illustrates the conventional shape measuring system disclosed in Japanese Patent No. 2690673. This shape measuring system is different in the following three points from the shape measuring system shown in FIG. 10. The first point is the use of a semiconductor laser 101B as a light source, the second point is that intensity modulation is performed directly by the semiconductor laser 101B without the use of a modulator using such a crystal as Pockels cell, and the third point is that demodulation is performed by an image intensifier 111 without the use of a demodulator using such a crystal as Pockels cell. Light which has been subjected to intensity modulation in accordance with a signal provided from the modulation/demodulation signal generator 104 is radiated from the semiconductor laser 101B and is then projected planewise onto the object 6 by the projection lens 106. Reflected light 105b from the object 6 is focused on the image intensifier 111 by the focusing lens 107. The signal from the modulation/demodulation signal generator 104 is converted to a high-voltage signal by a high-voltage drive circuit 112, which signal is inputted to a gain controller terminal of the image intensifier 111. Thus, the intensity-demodulated reflected light is picked up by the CCD camera 109. A intensity image obtained in the CCD camera 109 contains phase information based on the distance up to the object 6. By processing this intensity image with the computer 110 it is possible to obtain distance data of the object 6 at a single pick-up of image.

However, the shape measuring system shown in FIG. 10 is disadvantageous in that the cost thereof is very high because a modulator/demodulator using such a crystal as Pockels cell is used for each of the plane modulator 103 and the plane demodulator 108. Moreover, since the modulator/demodulator using such a crystal is of a small aperture which is several millimeters or so, it is necessary that the light emitted from the light source 101A and the light reflected by the object 6 be condensed in conformity with the said aperture by the condenser lens 107, with consequent increase in system size.

The shape measuring system shown in FIG. 11 is also disadvantageous in that it is very expensive because the image intensifier 111 is used. Moreover, for driving the image intensifier 111 it is necessary to intensity-modulate a signal whose voltage is as high as several hundred volts, thus giving rise to a disadvantage that, the structure of a drive circuit used is complicated. Further, the whole of the system becomes larger in size because the image intensifier 111 is larger than the CCD camera 109.

As a distance measuring method using neither the expensive modulator/demodulator nor the expensive and large-sized image intensifier, a phase distribution measuring method using a reference light is disclosed, for example, in Japanese Published Examined Patent Application No. Sho 59-30233.

FIG. 12 illustrates a conventional shape measuring system which adopts the method just mentioned above. This shape measuring system, indicated at 100, comprises a light emitting element 123 adapted to emit light after intensity modulation at a predetermined frequency with a drive signal which is provided from a drive circuit 121 and which is based on a signal produced from an oscillator 120, a beam splitter 125 adapted to transmit and reflect light which is incident thereon from the light emitting element 123 through a projection lens 124, a light receiving element 127 adapted to receive a light reflected again by the beam splitter 125 after passage through the beam splitter 125 and after subsequent reflection by the object 6 and a light which has passed through the beam splitter 125 again after being reflected by the beam splitter 125 and after subsequent reflection by a reflecting mirror 128, an amplifier 128 which amplifies an output signal provided from the light receiving element 127, a wave detector 129 which detects an output signal provided from the amplifier 128, and a level meter 130 which reads an amplitude from an output signal provided from the wave detector 129.

In such a configuration, when from the light emitting element 123 is emitted a light after intensity modulation at a predetermined frequency with a drive signal which is provided from the drive circuit 121 and which is based on a signal produced from the oscillator 120, the light is directed to the beam splitter 125 through the projection lens 124. One light (illumination light) which has passed through the beam splitter 125 is reflected by an object 6 and then reflected by the splitter 125 and is introduced into the light receiving element 127 through the condenser lens 126. The other light (reference light) reflected by the beam splitter 125 is then reflected by the reflecting mirror 128 which is disposed at a known distance, then passes through the beam splitter 125 and enters the light receiving element 127. The illumination light and reference light are optically combined on the light receiving element 127 and the thus-combined light is converted its waveform into an electric signal, which is applied to the amplifier 128. The amplitude of this waveform varies depending on the difference between the distance from the light receiving element 127 to the object 6 and the distance from the light receiving element 127 to the reflecting mirror 128. The thus-amplified waveform signal is detected by the wave detector 129 and the amplitude thereof is read by the level meter 130, whereby the distance up to the object 6 can be calculated.

According to the above conventional shape measuring system, however, since the illumination light and the reference light each pass through the beam splitter 125 twice in the section from the light emitting element 123 to the light receiving element 127, the quantity of light incident on the light receiving element 127 decreases to one fourth, thus giving rise to the problem that the light utilization efficiency is poor.

Moreover, since the light incident on the light receiving element 127 is influenced by reflectance on the surface of the object 6 and the distance up to the object 6 is calculated on the basis of an output signal provided from the light receiving element 127, there arises the problem that an accurate distance cannot be measured due to the difference in reflectance of the object surface.

The conventional shape measuring system in question further involves the following serious problems. For an object having concave and convex with respect to an optical axis it is impossible to make an accurate measurement of distance. Accurate distance cannot be measured where extraneous light is present although no problem arises in the dark. For the measurement of a three-dimensional shape it is necessary that light be scanned in two dimensions, resulting in increase of the measurement time. Thus, the measurement of distance is infeasible in ordinary environmental conditions.

SUMMARY OF THE INVENTION

Accordingly, present invention provides a shape measuring system which is small in size, low in cost and high in the light utilization efficiency.

The present invention also provides a shape measuring system and method capable of measuring the distance up to an object accurately without being influenced by external conditions such as a change in reflectance of an object surface.

The present invention also provides a shape measuring system wherein a light having been intensity-modulated at a predetermined frequency is emitted toward an object and the distance up to the object is determined on the basis of a phase difference between reflected light from the object and the emitted light, the shape measuring system comprising a light emitting unit that emits the light having been intensity-modulated at the predetermined frequency toward the object, a reflecting member that reflects in a predetermined direction a part of the light emitted from the light emitting unit, and a detecting unit that receives the light reflected from the object and also receives the light reflected by said reflecting member and that outputs a detection signal with the said phase difference reflected therein.

In the above construction, as the reflecting member there may be used, for example, a beam splitter which transmits and reflects the emitted light at a predetermined ratio or a reflecting mirror disposed at a position not obstructing the radiation of emitted light to the object. The use of a beam splitter as the reflecting member is advantageous in that the emitted light passes through the beam splitter only once and that therefore the quantity of the reflected light and that of the emitted light both received by the detecting unit are prevented from decrease by the beam splitter. Likewise, the use of a reflecting mirror as the reflecting member is advantageous in that the quantity of the reflected light and that of the emitted light both received by the detecting member are prevented from decrease by the reflecting mirror.

The present invention also provides a shape measuring system wherein a light having been intensity-modulated at a predetermined frequency is emitted toward an object and the distance up to the object is determined on the basis of a phase difference between reflected light from the object and the emitted light, the shape measuring system comprising a light emitting unit that emits the light having been intensity-modulated at the predetermined frequency or a stationary light not intensity-modulated toward the object, a reflecting member that reflects in a predetermined direction a part of the light emitted from the light emitting unit or a part of the stationary light, a detecting unit that receives the light reflected from the object and also receives the light reflected by the reflecting member and that outputs a composite detection signal produced by combining both received lights and with the said phase difference reflected therein, the detecting unit further receiving the stationary light reflected by the object and outputting a reflected stationary light detection signal, the detecting unit further receiving the stationary light from the reflecting member and outputting a stationary light detection signal, and a calculating unit that, in accordance with the said composite detection signal, the said reflected stationary light detection signal and the said stationary light detection signal, makes correction for eliminating external components such as a change in reflectance of the object and calculates the said distance.

According to this construction, the distance up to the object can be determined accurately by eliminating external components such as a change in reflectance of the object.

The present invention further provides a shape measuring system wherein light having been intensity-modulated at a predetermined frequency is emitted toward an object and the distance up to the object is determined on the basis of a phase difference between reflected light from the object and the emitted light, the shape measuring system comprising a light emitting unit that emits the light having been intensity-modulated at the predetermined frequency or a stationary light not intensity-modulated toward the object, a detecting unit that receives the light reflected from the object and also receives the emitted light and outputs a composite detection signal produced by combining both received lights and with the said phase difference reflected therein, and then receives the emitted stationary light after the reflection by the object and outputs a reflected stationary light detection signal, and further receives the stationary light and outputs a stationary light detection signal, and a calculating unit that, in accordance with the said composite detection signal, the said reflected stationary light detection signal and the said stationary light detection signal, makes correction for eliminating external components such as a change in reflectance of the object and calculates the said distance.

According to this construction, even in such an optical system as shown in FIG. 12, the distance up to the object can be determined accurately by removing an external component such as a change in reflectance of the object.

The present invention further provides a shape measuring method wherein a light having been intensity-modulated at a predetermined frequency is emitted toward an object and the distance up to the object is determined on the basis of a phase difference between reflected light from the object and the emitted light, the shape measuring method comprising a first step and a second step, the first step comprising emitting the light intensity-modulated at the predetermined frequency toward the object, detecting the reflected light and the emitted light, combining both lights into a composite detection signal with the phase difference reflected therein, emitting a stationary light not intensity-modulated toward the object, detecting the stationary light reflected from the object, converting the reflected stationary light thus detected into a reflected stationary light detection signal, and detecting the stationary light and converting it into a stationary light detection signal, and the second step comprising making correction for eliminating external components such as a change in reflectance of the object and calculating the said distance, in accordance with the said composite detection signal, the said reflected stationary light detection signal and the said stationary light detection signal.

According to this construction, the removal of external components such as a change in reflectance of the object permits the distance up to the object to be determined accurately.

BRIEF DESCRIPTION OF THE DRAWINGS

Preferred embodiments of a shape measuring system and method according to the present invention will be described in detail based on the drawings.

DETAILED DESCRIPTION OF PREFERRED EMBODIMENTS

Figure 1:
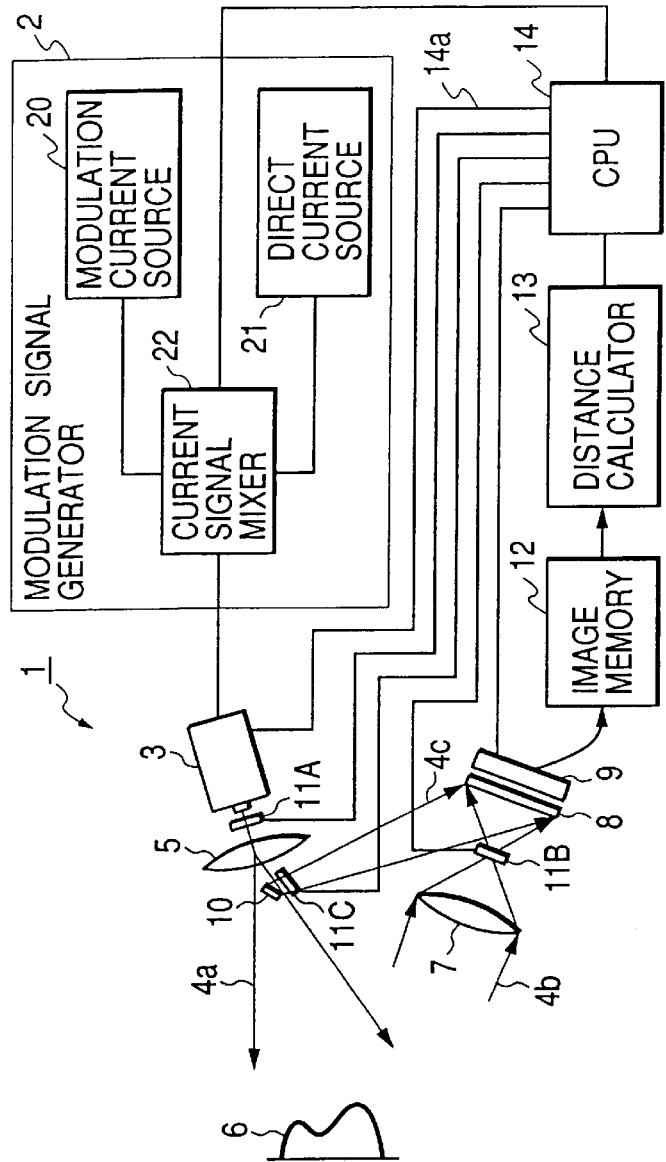
FIG. 1 is a construction diagram of a three-dimensional shape measuring system according to the first embodiment of the present invention.

FIG. 1 illustrates a three-dimensional shape measuring system according to the first embodiment of the present invention. This measuring system, indicated at 1, comprises a modulation signal generator 2 which generates a modulation signal, a semiconductor laser 3 which emits a laser beam as an illumination light 4a in accordance with the modulation signal produced from the modulation signal generator 2, a projection lens 5 which projects the illumination light 4a from the semiconductor laser 3 toward an object 6, a focusing lens 7 which focuses reflected light 4b reflected by the object 6 onto a plane sensor 9 through an optical filter 8, a half mirror 10 which allows a half of the illumination light 4a from the semiconductor laser 3 to pass therethrough and the remaining half thereof to be reflected thereby and conducted as a reference light 4c onto the plane sensor 9 through the optical filter 8, a first shutter 11A disposed between the semiconductor laser 3 and the projection lens 5, a shutter 11B disposed between the object 6 and the optical filter 8, a third shutter 11C disposed between the half mirror 10 and the optical filter 8, a two-dimensional image memory 12 which stores an output signal from the plane sensor 9 as intensity information, a distance calculator 13 which calculates distance data on a surface shape of the object 6 in a two-dimensional manner on the basis of the intensity information stored in the image memory 12, and a CPU 14 which controls various components of the system 1.

In accordance with the modulation signal provided from the modulation signal generator 2 the semiconductor laser 3 emits an intensity-modulated signal as the illumination light 4a, and in accordance with a stationary signal provided from the modulation signal generator 2 the semiconductor laser 3 emits as the illumination light 4a a stationary light which has not been intensity-modulated. This stationary light has a light intensity equal to an average intensity of the intensity-modulated illumination light 4a.

As each of the first to third shutters 11A, 11B and 11C, there may be used, for example, a single crystal plate having an electro-optical effect, the single crystal plate being disposed between a polarizer and an analyzer and provided at both ends thereof with transparent electrodes. Liquid crystal or a mechanical shutter may also be used. The shutters used in this embodiment are of the type which transmits incident light upon application (ON) of voltage.

Figure 2:
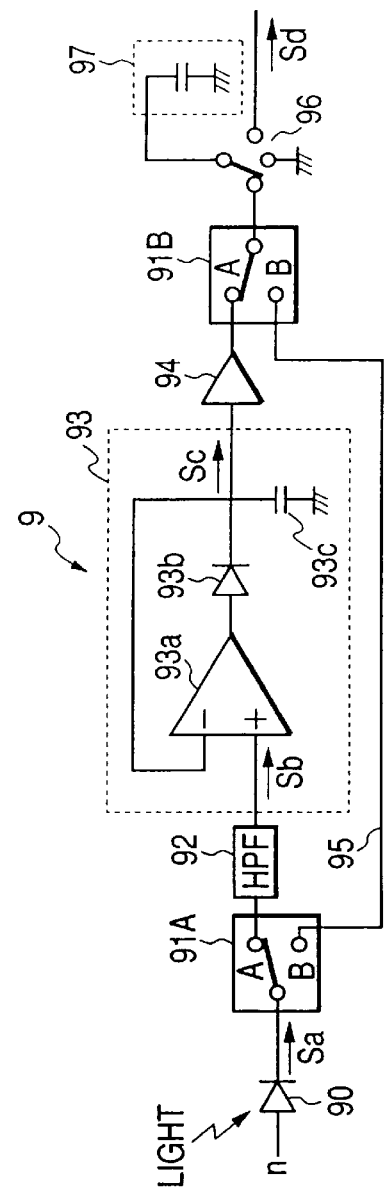
FIG. 2 is a block diagram showing a pixel circuit which constitutes a plane sensor used in the first embodiment.

FIG. 2 illustrates one pixel circuit which constitutes the plane sensor 9. The plane sensor 9 has a plurality of pixels arranged in two dimensions. One pixel comprises: a photodiode 90; a first by-pass circuit change-over unit 91A; a high pass filter (HPF) 92, a peak holding circuit 93 which comprises a comparator 93a, a diode 93b and a capacitor 93c; a current converter circuit 94; a second by-pass circuit change-over unit 91B; a by-pass line 95 which is connected to both first and second by-pass circuit change-over units 91A, 91B and which by-passes both HPF 92 and peak holding circuit 93; a switch 96; and a charge storage circuit 97. The plane sensor 9 has an amplitude detecting mode and a light quantity detecting mode.

Figure 3A:
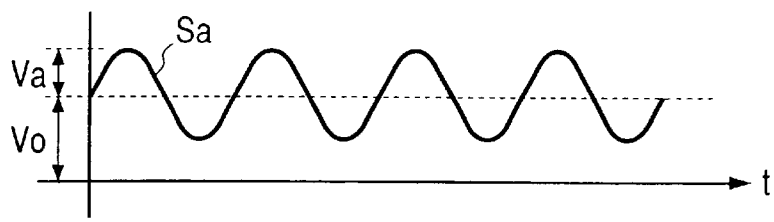
FIG. 3 is a timing chart for explaining the operation of the plane sensor.
Figure 3B:
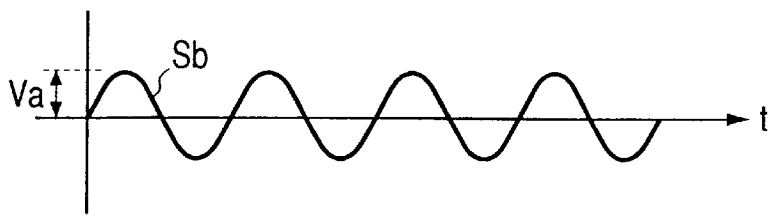
Figure 3C:
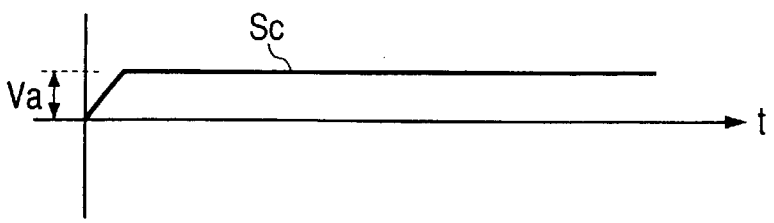
Figure 3D:
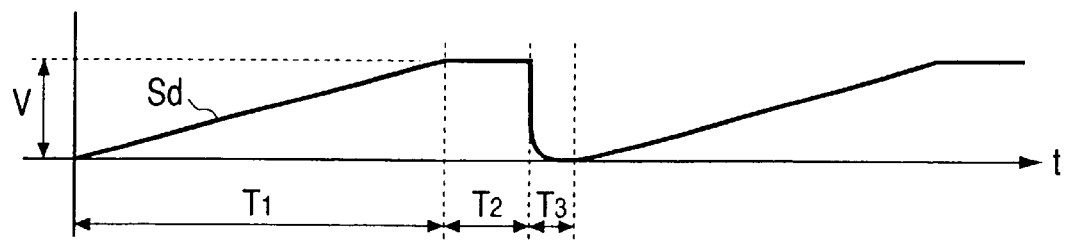

FIGS. 3A to 3D illustrate the operation of the plane sensor 9. If the first and second by-pass circuit change-over units 91A, 91B are set on the side A, as shown in FIG. 3A, a signal Sa is outputted from the photodiode 90 and is then cut off its DC component V0 by HPF 92 into a high-frequency signal Sb shown in FIG. 3B, which is inputted to the peak holding circuit 93. From the peak holding circuit 93 is outputted a peak value signal Sc which is held at a peak value of amplitude, as shown in FIG. 3C. The peak value signal Sc is very low in voltage and is difficult to detect, so is converted into an electric current by the converter circuit 94 and is then stored for a predetermined period of time in the charge storage circuit 97. Voltage Sd stored in the charge storage circuit 97 increases linearly as in FIG. 3D and if integration is performed for a sufficiently long period of time T1 in comparison with the modulation frequency $\omega/2\pi$ of laser beam, there is obtained a voltage value V which is easily detectable. It is apparent that the voltage value V is proportional to the amplitude of the composite light. In a data transfer period T2, the voltage value V is transferred to the distance calculator 13. From the charge storage circuit 97 is detected an amplitude of the intensity-modulated light reflected from the object 6 and there is obtained an image signal which contains phase data corresponding to the distance up to the object 6. In a discharge period T3, the charge storage circuit 97 is grounded by the switch 96 and the stored charge is released, followed by re-start of storage. On the other hand, if the first and second by-pass circuit change-over units 91A, 91B are set on the side B, the output signal Sa from the photodiode 90 is inputted directly to the charge storage circuit 97 and an average luminance of the stationary light reflected from the object is detected, affording luminance data of the object 6. With these circuits, the amplitude of a high-frequency component contained in the output signal Sa of the photodiode 90 can be detected in the form of voltage.

The operation of the system 1 will now be described in accordance with a flow chart of FIG. 6 with reference also to FIGS. 4 and 5. FIGS. 4A and 4B shows in terms of computer simulation that the amplitude of the composite light changes due to a phase lag of the reflected light 4b. FIG. 5A shows an image pick-up condition using illumination light 4a and reference light 4c, both having been subjected to intensity modulation, FIG. 5B shows an image pick-up condition using illumination light which is a stationary light and extraneous light, FIG. 5C shows an image pick-up condition using extraneous light alone, and FIG. 5D shows an image pick-up condition using only reference light that is a stationary light.

(1) Image pick-up using both illumination light and reference light

As shown in FIG. 5A, an image is picked up from the object 6 on condition that both illumination light 4a and reference light 4c have been subjected to intensity modulation (ST1). More specifically, the CPU 14 provides a control signal to a current signal mixer 22 in the modulation signal generator 2, thereby causing the current signal mixer 22 to combine the output of a modulation current source 20 and that of a direct current source 21 and generate the intensity-modulated illumination light 4a from the semiconductor laser 3. Further, the CPU 14 provides control signals to the first to third shutters 11A, 11B and 11C, thereby causing all of the shutters to open and all of the illumination light 4a generated from the semiconductor laser 3, the reflected light 4b from the object 6 and the reference light 4c to pass therethrough. In more particular terms, the illumination light 4a from the semiconductor laser 3 passes through the first shutter 11A and enters the half mirror 10 through the projection lens 5. The illumination light 4a thus incident on the half mirror 10 is divided into a transmitting light and a reflected light. The illumination light 4a which has passed through the half mirror 10 is radiated to the object 6 and the reflected light 4b from the object 6 passes through the focusing lens 7 and the second shutter 11B and is focused onto the plane sensor 9 through the optical filter 8. The reference light 4c reflected by the half mirror 10 enters the plane sensor 9. Thus, a composite light of both reflected light 4b and reference light 4c is incident on the plane sensor 9. The CPU 14 further provides a control signal to the plane sensor 9 to set the light detecting mode in the plane sensor 9 to the amplitude detecting mode for detecting the amplitude of the intensity-modulated light. By picking up an image in this state, such amplitude information on the composite light of both reflected light 4b and reference light 4c as is represented by expression (6) to be described later is stored as intensity information (image data An) in the image memory 12.

Figure 5A:
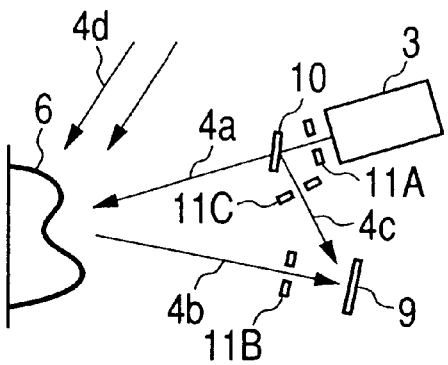
FIGS. 5A to 5D are diagrams for explaining the operation of the three-dimensional shape measuring system according to the first embodiment.
Figure 5B:
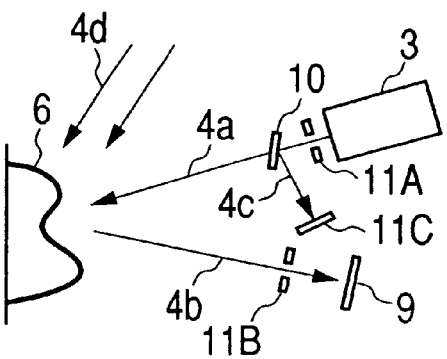
Figure 6:
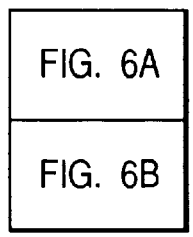
FIG. 6 is a flow chart for explaining the operation of the three-dimensional shape measuring system according to the first embodiment.
Figure 6A:
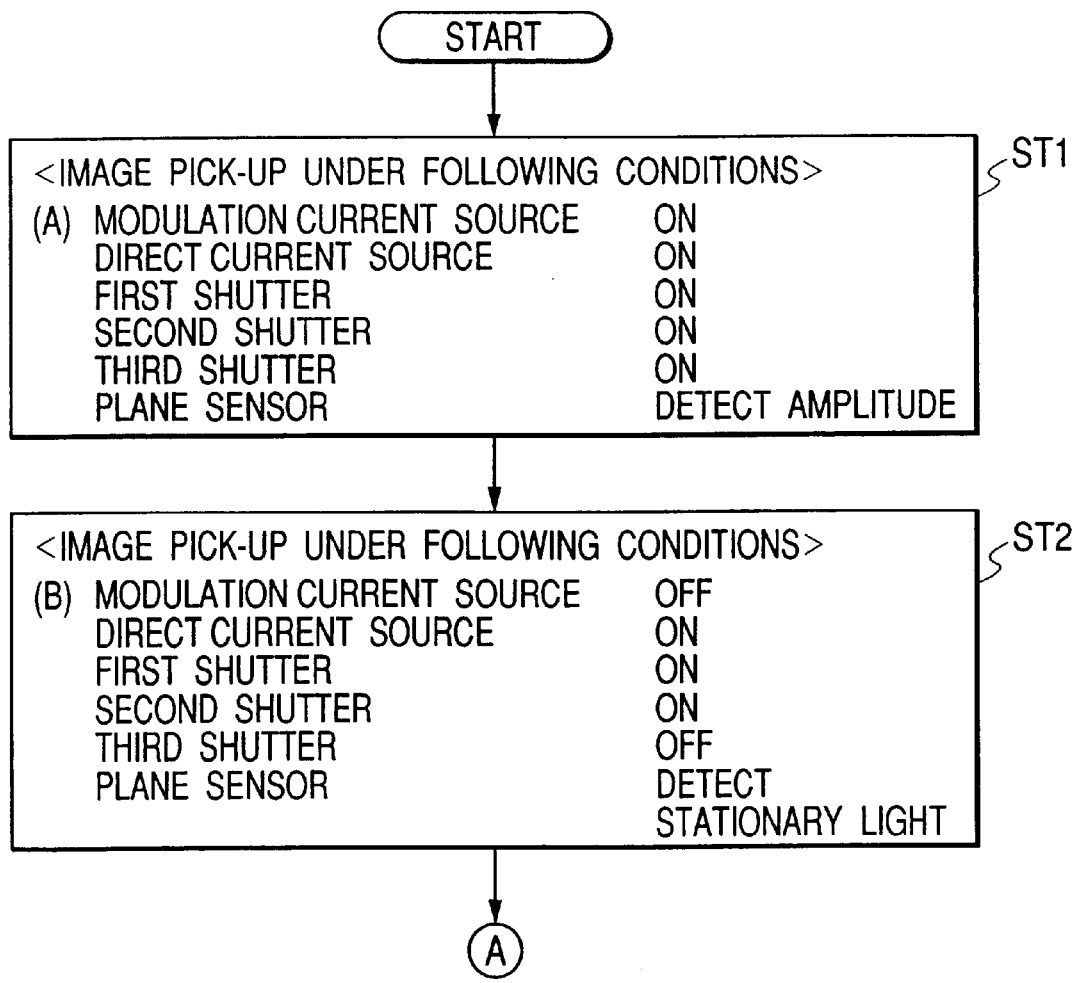
Figure 6B:
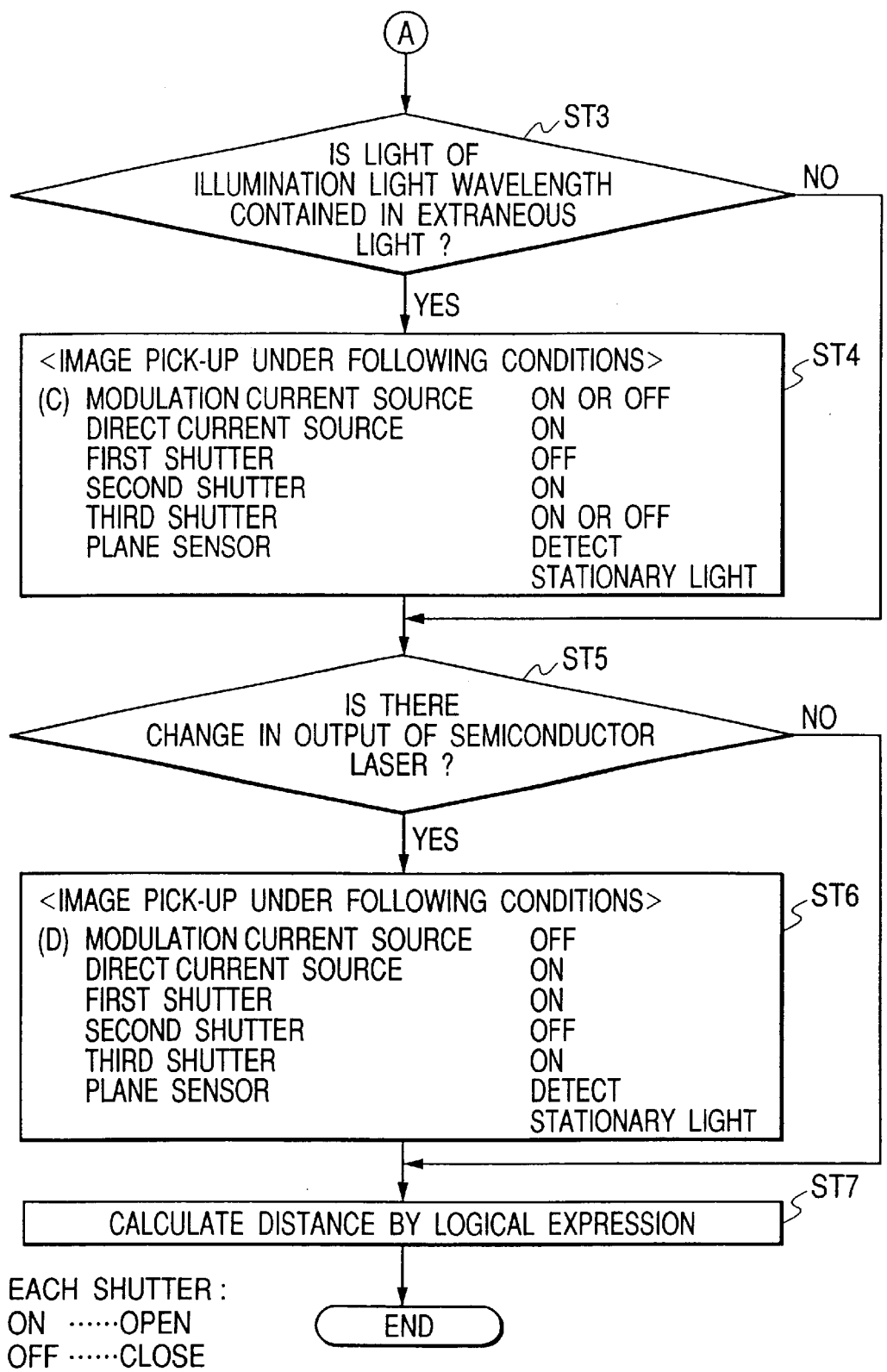

(2) Image pick-up using a stationary light as illumination light and extraneous light An image of the object 6 is picked up by radiation of the illumination light 4a which is a stationary light and while the reference light 4c is shielded (ST2), as shown in FIG. 5B. More specifically, under control made by the CPU 14, the current signal mixer 22 outputs only the output from the direct current source 21 and causes a stationary light as illumination light 4a to be generated from the semiconductor laser 3. The CPU 14 provides control signals to the first to third shutters 11A, 11B and 11C to open the shutters 11A and 11B and close the shutter 11C, thereby causing the illumination light generated from the semiconductor laser 3 and the reflected light 4b from the object 6 to transmit and shielding the reference light 4c. Further, the CPU 14 provides a control signal to the plane sensor 9 to set the light detecting mode in the plane sensor 9 to the light quantity detecting mode. By picking up an image in this state, such luminance information on the object 6 illuminated with the stationary light as is represented by expression (7) to be described later is stored in as intensity information (image data Bn) in the image memory 12 in a two-dimensional manner.

(3) Image pick-up with extraneous light alone

In the case where light having the wavelength of the illumination light 4a is contained in the extraneous light 4d (ST3), there is performed an image pick-up step (ST4) which follows, while if such light is not contained in the extraneous light 4d, a jump is made to further steps (ST5, 6). Here, as shown in FIG. 5C, the illumination light 4a is shielded and an image of the object 6 is picked up with the extraneous light 4d alone. More specifically, the CPU 14 provides a control signal to the current signal mixer 22, causing the current signal mixer to output at least the output from the direct current source 21 and a stationary light or an intensity-modulated light to be generated as the illumination light 4a from the semiconductor laser 3. Further, the CPU 14 provides control signals to the first to third shutters 11A, 11B and 11C to open the second shutter 11B and close the first shutter 11A, thereby shielding the illumination light 4a generated from the semiconductor laser 3 and allowing the reflected light 4b from the object 6 to transmit. The CPU 14 further provides a control signal to the plane sensor 9 to set the light detecting mode in the plane sensor 9 to the light quantity detecting mode. By picking up an image in this state, luminance information on the object 6 illuminated with the extraneous light 4d alone, such as that represented by expression (8) to be described later, is stored as intensity information (image data Cn) in the image memory 12 in a two-dimensional manner.

(4) Image pick-up with reference light alone

Next, monitoring a semiconductor laser monitor output line 14a, the CPU 14 performs the following image pick-up step (ST6) if a change in laser output is larger than a preset threshold value (ST5). On the other hand, if the change in laser output is smaller than the preset threshold value, the CPU 14 terminates the image pick-up. operation; provided, however, that intensity information (image data Dn) obtained by performing the following image pick-up operation only once at the time of start-up of the system 1 is stored beforehand in the image memory 12 and is used in the calculation of distance data which will be described later. Here, as shown in FIG. 5D, the reflected light 4b from the object 6 is shielded and only the reference light 4c is used for image pick-up. To be more specific, the CPU 14 provides a control signal to the current signal mixer 22, thereby causing the current signal mixer to output only the output from the direct current source 21 and a stationary light to be generated as the illumination light 4a from the semiconductor laser 3. Further, the CPU 14 provides control signals to the first to third shutters 11A, 11B and 11C to open the first and third shutters 11A, 11C and close the second shutter 11B, thereby shielding the reflected light 4b from the object 6 and allowing the reference light 4c to transmit. The CPU 14 further provides a control signal to the plane sensor 9 to set the light detecting mode in the plane sensor 9 to the light quantity detecting mode. By picking up an image in this state, such luminance information based on the reference light 4c of a stationary light as is represented by expression (9) to be described later is stored as intensity information (image data Dn) in the image memory 12 in a two-dimensional manner.

(5) Calculating distance data in a two-dimensional manner

On the basis of two to four sheets of image data An, Bn, Cn, Dn thus picked up, the distance calculator 13 calculates distance data in a two-dimensional manner in accordance with expression (12) which will be described later (ST7).

A description will now be given in detail about the said calculation. Given that an angular frequency of modulation is $\omega$ and amplitude is 2E, the intensity-modulated illumination light 4a generated from the semiconductor laser 3 is represented like the following expression (1):

$$I_0 = E(\sin \omega t + 1) \tag{1}$$

Assuming that the distance up to the object 6 is 0–2.5 m, the modulation frequency required is 30 MHz. Given that the light transmittance in the half mirror 10 is a and the reflection coefficient at a certain point on the object 6 is Cn, the intensity of the reflected light 4b incident on point, n, as a point formed by focusing of the above point on the plane sensor 9 is expressed like the following expression (2) assuming that the intensity of the extraneous light 4d is e:

$$I_n = d_1 c_n \cdot aE\{\sin(\omega t + \phi_n) + 1\} + e \tag{2}$$

Where, d1 stands for a constant which depends on the optical system (projection system and focusing system) in the system 1 and $\phi_n$ stands for a phase lag which is related to a time of flight of the light incident on the plane sensor 9 from the light source. If the distance of (semiconductor laser–object 6)+(object 6–plane sensor 9) is assumed to be L (C is the velocity of light):

$$\phi_n = \frac{\omega L}{C}$$

On the other hand, assuming that the reflectance of the half mirror 10 is b and that the optical path length from the semiconductor laser 3 to the plane sensor 9 and the size of the plane sensor 9 are sufficiently small in comparison with the wavelength of the modulated wave, the intensity of the reference light 4c on the plane sensor 9 becomes uniform and the following expression (3) is established at point n on the plane sensor 9:

$$R_n = d_2 bE\{(\sin \omega t + 1\} \tag{3}$$

Where, $d_2$ is a constant which depends on the optical system (focusing system) in the system 1.

The light intensity $P_n$ at point n on the plane sensor 9 is of a combined light of both reflected light 4b and reference light 4c and is represented like the following expression (4) as a result of addition of expressions (2) and (3):

$$P_n = I_n + R_n \quad (4)$$

$$= d_1 c_n \cdot aE\{\sin(\omega t + \phi_n) + 1\} + e + d_2 bE\{\sin\omega t + 1\}$$

$$= d_1 c_n \cdot aE\{\sin\omega t \cos\phi_n + \cos\omega t \sin\phi_n + 1\} + e + d_2 bE\{\sin\omega t + 1\}$$

$$= (d_1 c_n \cdot a + d_2 b)E + e + (d_1 c_n \cdot aE\cos\phi_n + d_2 bE)\sin\omega t + d_1 c_n \cdot aE\sin\phi_n \cos\omega t$$

$$= (d_1 c_n \cdot a + d_2 b)E + e + \sqrt{(d_1 c_n \cdot aE\cos\phi_n + d_2 bE)^2 + (d_1 c_n \cdot aE\sin\phi_n)^2}\, \sin(\omega t + \theta)$$

$$= (d_1 c_n \cdot a + d_2 b)E + e + \sqrt{(d_1 c_n \cdot aE)^2 + (d_2 bE)^2 + 2(d_1 c_n \cdot aE)(d_2 bE)\cos\phi_n}\, \sin(\omega t + \theta)$$

Provided, $$\tan\theta = \frac{d_1 c_n aE\sin\phi_n}{d_1 c_n aE\cos\phi_n + d_2 bE}$$

Figure 4A:
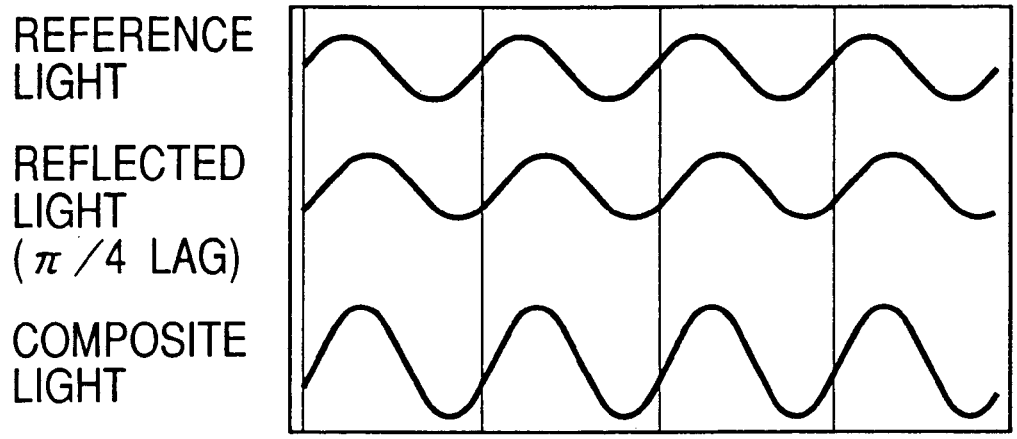
FIGS. 4A and 4B are diagrams showing, in terms of computer simulation, a change in amplitude of a composite light due to a phase lag of reflected light.
Figure 4B:
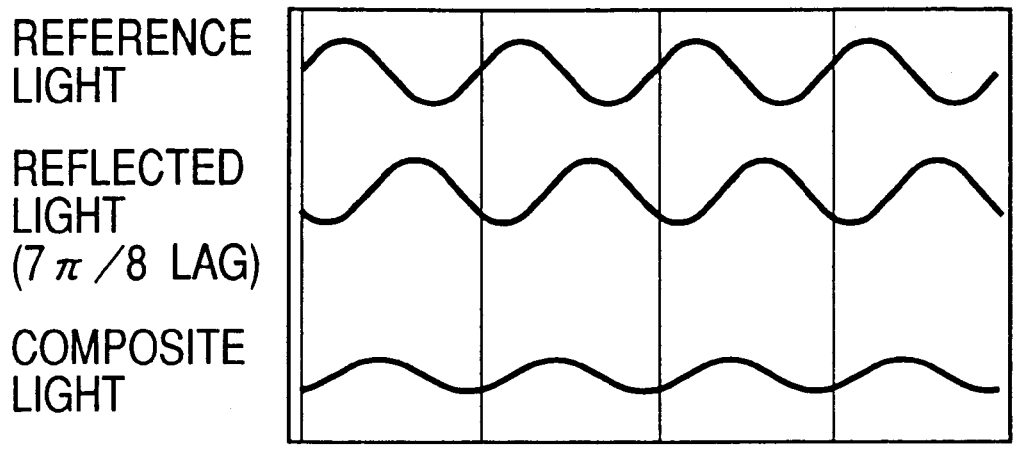
Figure 5C:
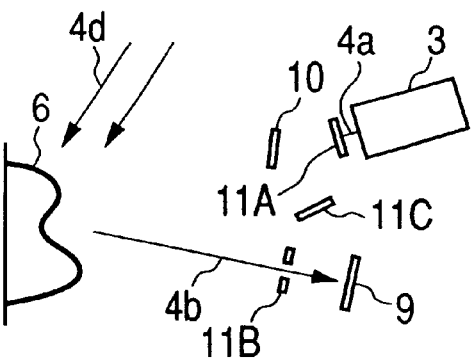
Figure 5D:
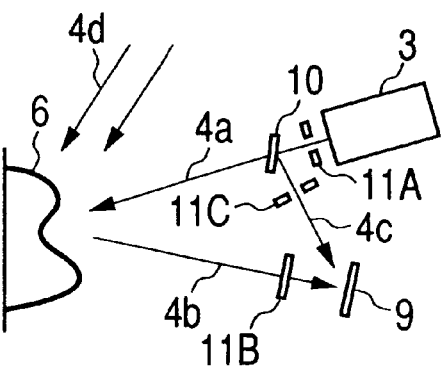

FIG. 4A is with a relatively small distance up to the object 6, that is, with a small phase lag ($\pi/4$ lag), in which the amplitude of the combined light, or composite light, is large, while FIG. 4B is with a relatively large distance up to the object 6, that is, with a large phase lag ($7\pi/8$ lag), in which the amplitude of the composite light is small. As shown in the above expression (4), the composition light corresponds to the sum of the following DC component:

$$(d_1 c_n a + d_2 b)E + e \quad (5)$$

and the following high-frequency component:

$$\sqrt{(d_1 c_n \cdot aE)^2 + (d_2 bE)^2 + 2(d_1 c_n \cdot aE)(d_2 bE)\cos\phi_n} \sin(\omega t + \theta)$$

Since $d_1 c_n$ aE and $d_2 bE$ appearing in the amplitude term are reflected light (including surface reflectance of the object) 4b and reference light 4c components both based on light not intensity-modulated, it is possible to make measurement beforehand as follows.

In the mage pick-up condition shown in FIG. 5A, if the amplitude of the intensity-modulated light incident on the plane sensor 9 is assumed to be $2A_n$, $A_n$ can be written like the following expression (6):

$$A_n = \sqrt{(d_1 c_n \cdot aE)^2 + (d_2 bE)^2 + 2(d_1 c_n \cdot aE)(d_2 bE)\cos\phi_n} \quad (6)$$

In the image pick-up condition shown in FIG. 5B, the intensity of light incident on the plane sensor 9 is represented as follows:

$$B_n = d_1 c_n \cdot aE + e \quad (7)$$

In the image pick-up condition shown in FIG. 5C, the intensity of light incident on the plane sensor 9 is represented as follows:

$$C_n = e \quad (8)$$

In the image pick-up condition shown in FIG. 5D, the intensity of light incident on the plane sensor 9 is represented like the following expression (9):

$$D_n = d_2 bE \quad (9)$$

From the above expressions (6), (7), (8) and (9), the amplitude of the composite wave is represented like the following expression (10):

$$A_n = \sqrt{(B_n - C_n)^2 + D_n^2 + 2(B_n - C_n)D_n \cos\phi_n} \quad (10)$$

Given that the distance between the semiconductor laser 3 as the light source and the object 6 and the distance between the object 6 and the plane sensor 9 are L and that the light velocity is C, the phase lag $\phi_n$ is represented like the following expression (11):

$$\phi_n = \frac{\omega L}{C} \quad (11)$$

From the above expressions (10) and (11), the distance L is represented like the following expression (12) using the foregoing four kinds of image data An, Bn, Cn and Dn:

$$L = \frac{C}{\omega}\cos^{-1}\left\{\frac{A_n^2 - (B_n - C_n)^2 - D_n^2}{2(B_n - C_n)D_n}\right\} \quad (12)$$

It follows that the distance up to the object 6 can be calculated by detecting the four kinds of image data An, Bn, Cn and Dn. Since the reflection coefficient $C_n$ of the object 6, constants $d_1$, $d_2$ based on the optical system, and extraneous light intensity, e, are not contained in the expression (12), it is possible to obtain distance information no matter what reflectance distribution the object to be measured may have and not matter what extraneous light 4d may be present in image pick-up.

According to the first embodiment described above, there are attained the following effects.

(a) Since the number of time in which the illumination light 4a emitted from the semiconductor laser 3 passes the half mirror 10 and the number of time in which the reference light 4c passes the half mirror 10 are each once, it is possible to suppress the decrease in the quantity of the reflected light and that of the reference light 4c both received by the plane sensor 9.

(b) Since an expensive and large-sized unit so far used as a light demodulating unit such as a light intensity demodulator or an image intensifier is not needed, it is possible to obtain a phase distribution proportional to the distance up to an object and hence possible to provide a less expensive and small-sized three-dimensional shape measuring system.

(c) Since the optical filter 8 which transmits the light from the light source selectively is disposed on the front side of the plane sensor 9, if there is used an infrared or ultraviolet light source as the light source, it is possible to measure a three-dimensional shape with a high accuracy and with a minimized error caused by the extraneous light 4d.

(d) Since a phase distribution proportional to the distance up to the object 6 can be measured in terms of a voltage value, it is possible to measure a three-dimensional shape easily.

(e) Since both range image and intensity image can be obtained with a single plane sensor 9 and the pixels of these two images are in one-to-one correspondence to each other, it is possible to easily effect image processing for a intensity image using a range image.

(f) Since up to four sheets of images are picked up under different lighting conditions, distance information can be acquired no matter what reflectance distribution the object 6 may have and what extraneous light 4d may be present in image pick-up.

(g) Since both range image and intensity image are obtained, it is easy, for example, to prepare a composite image by combining an image picked up in a studio with a building image and a background image and cut out an object image from the composite image.

Figure 7:
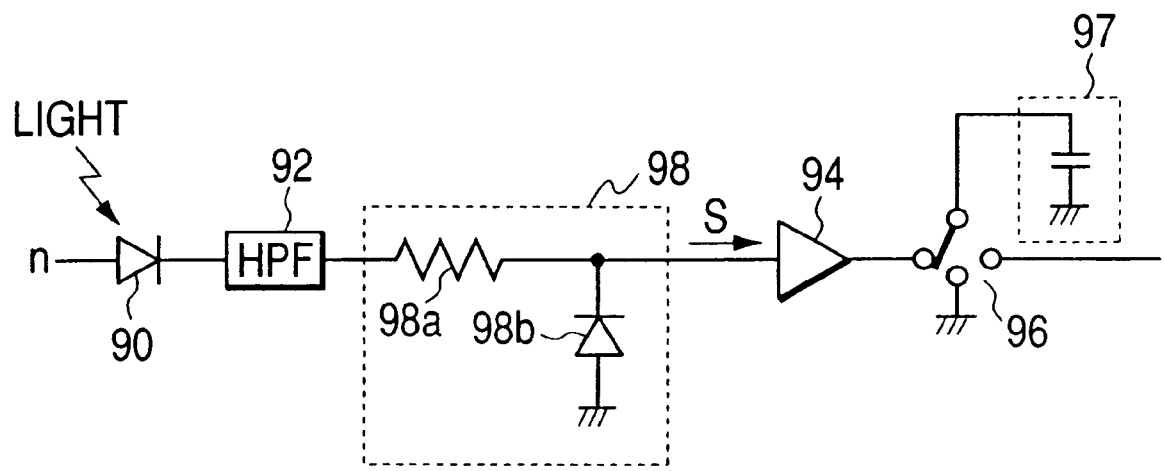
FIG. 7 is a block diagram showing another example of plane sensor.
Figure 8:
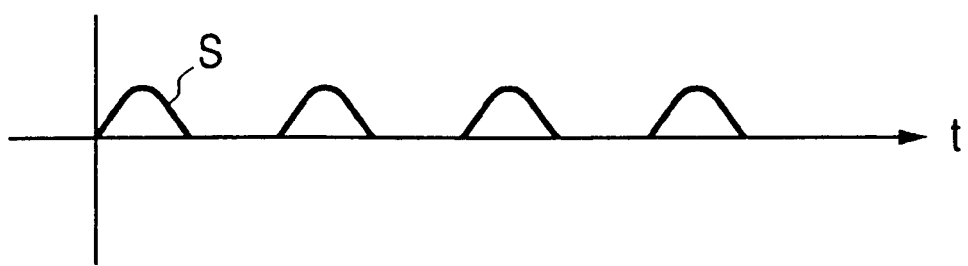
FIG. 8 is a timing chart for explaining the operation of the plane sensor shown in FIG. 7.

FIG. 7 shows an example of using a rectifier circuit 98 instead of the peak holding circuit 93 shown in FIG. 2, the rectifier circuit 98 comprising a resistor 98a and a diode 98b. The operation of this plane sensor is the same as in FIG. 3 except that such a rectification signal S as shown in FIG. 8 is outputted from the rectifier circuit 98.

Figure 9:
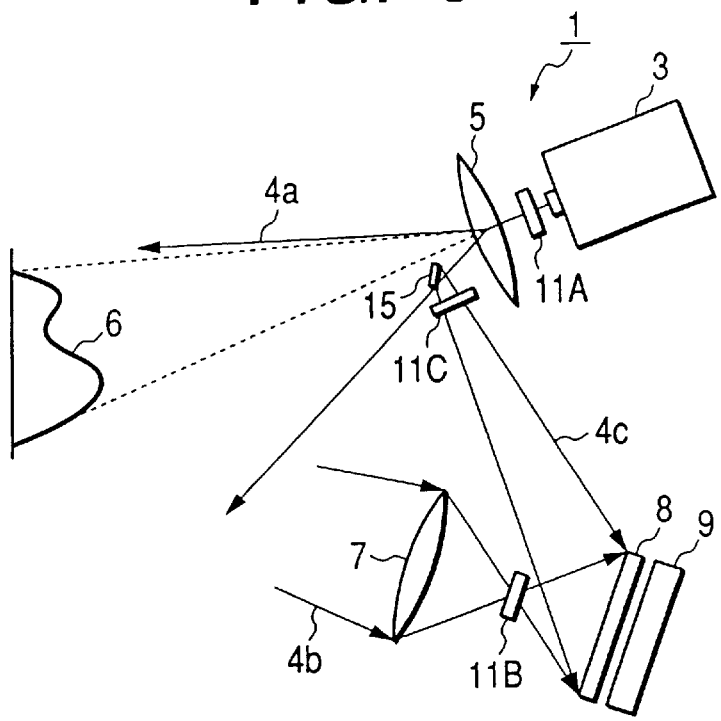
FIG. 9 is a construction diagram of a three-dimensional shape measuring system according to the second embodiment of the present invention.
Figure 10:
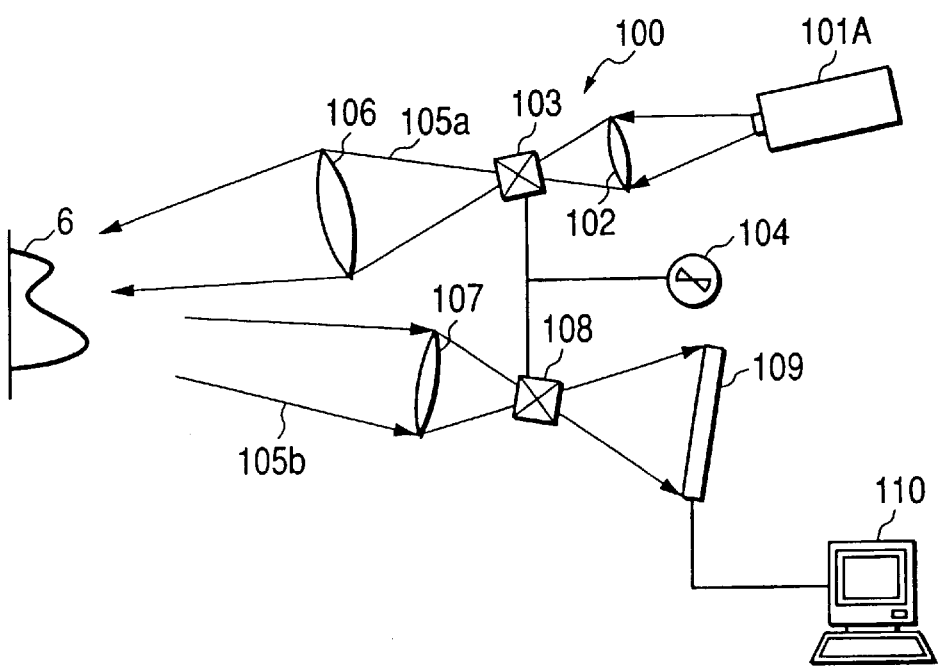
FIG. 10 is a construction diagram of a conventional three-dimensional shape measuring system.
Figure 11:
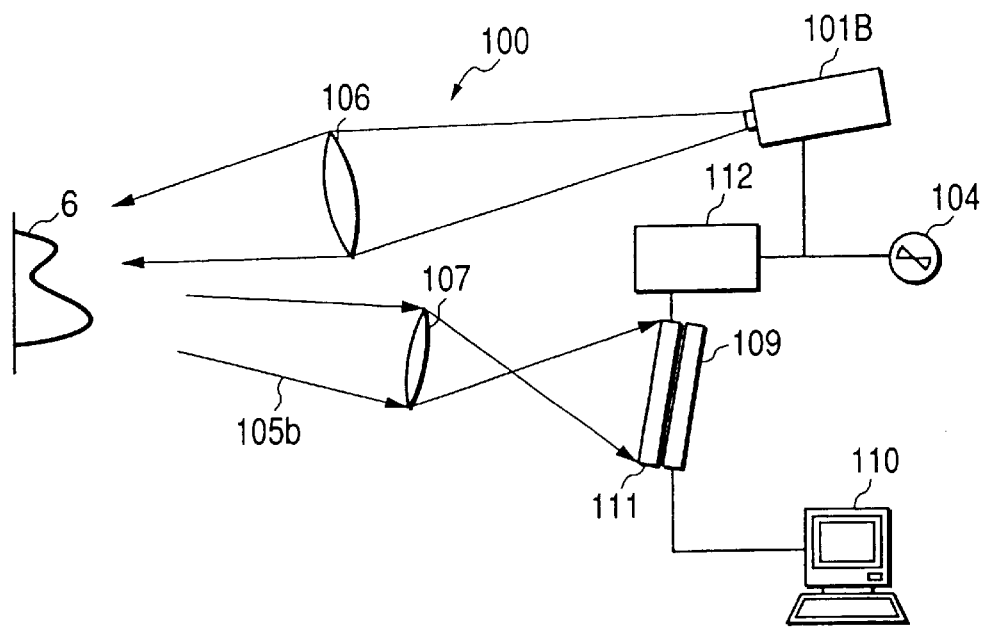
FIG. 11 is a construction diagram of a conventional three-dimensional shape measuring system.

FIG. 9 illustrates a shape measuring system according to the second embodiment of the present invention. In this second embodiment, instead of the half mirror 10 used in the first embodiment, a reflecting mirror 15 is disposed at a position deviated from an optical path (indicated with dotted lines in the same figure) of the illumination light 4a radiated to the object 6, with other constructional points being the same as in the first embodiment. According to this second embodiment, since the quantity of the reflected light 4b incident on the plane sensor 9 is not reduced to half by the half mirror 10, so that the output signal from the plane sensor 9 is enhanced and S/N ratio is improved.

The present invention is not limited to the above embodiments, but various modifications may be made. For example, although in the above embodiment a semiconductor laser is used as the light source, there may be used an ordinary type of a light source such as a xenon lamp or an electronic flash because a coherent light is not required in principle.

Although in the above embodiment both reflected light 4b and reference light 4c are received by a common plane sensor 9, a modification may be made such that the reflected light 4b is received by the plane sensor, the reference light 4c is received by one or plural light receiving elements, and a composite signal obtained by combining respective output signals is outputted.

Although in the above embodiment both intensity-modulated reflected light 4b and intensity-unmodulated reflected light 4b of a stationary light are received by the same pixel on the plane sensor 9, both may be received by separate pixels.

Although the half mirror 10 is used in the first embodiment, it may be substituted by a beam splitter which transmits and reflects the incident light at a predetermined ratio.

Figure 12:
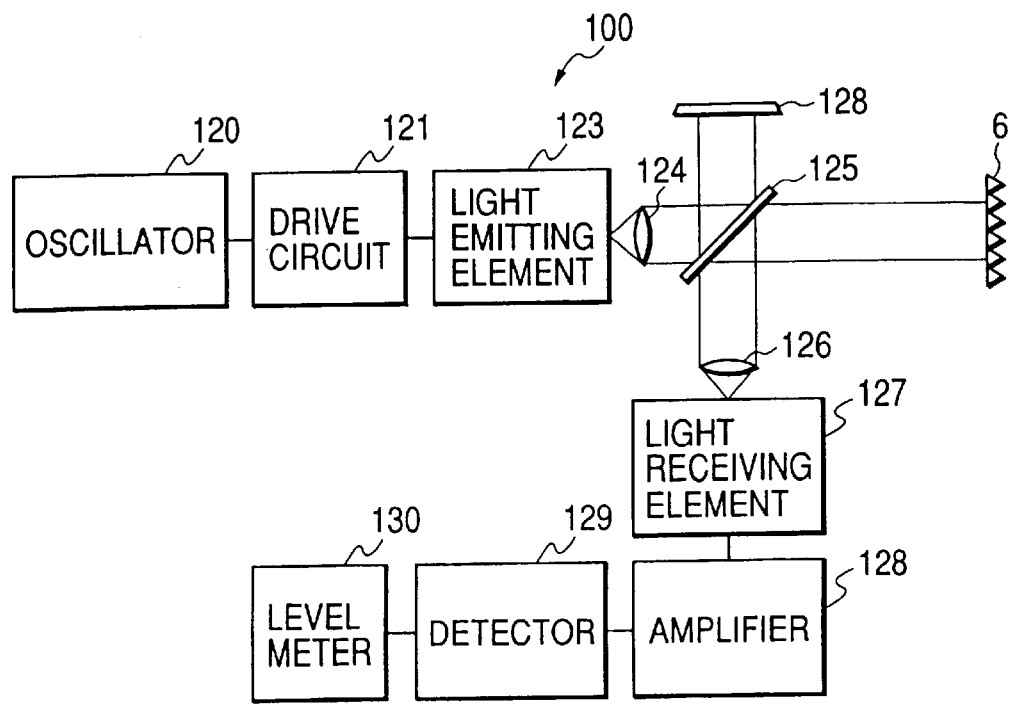
FIG. 12 is a construction diagram of a conventional three-dimensional shape measuring system.

The present invention which makes correction for removing an external component such as a change in reflectance of the object 6 maybe applied to the conventional configuration shown in FIG. 12.

Further, the first shutter 11A may be disposed on the optical path between the half mirror 10 and the object 6.

According to the present invention, as set forth above, since the quantity of the light emitted from the light emitting unit and that of the light reflected from an object can be prevented from being decreased by the reflecting member, the light utilization efficiency becomes higher. Moreover, since the distance up to the object is measured on the basis of a phase difference between an emitted light and a reflected light, it is not necessary to use an expensive modulator/demodulator or an expensive and large-sized image intensifier, so that it is possible to provide a small-sized and less expensive shape measuring system and method.

Further, since correction is made to eliminate external components such as a change in reflectance of an object in calculating the distance up to the object, it is possible to effect an accurate measurement of the distance up to the object.

What is claimed is:

1. A shape measuring system wherein a light having been intensity-modulated at a predetermined frequency is emitted toward an object and the distance up to said object is determined on the basis of a phase difference between reflected light from said object and said emitted light, said shape measuring system comprising:

a light emitting unit that emits said light having been intensity-modulated at said predetermined frequency and emits a stationary light not intensity-modulated toward said object;

a reflecting member that reflects in a predetermined direction a part of said light emitted from said light emitting unit and a part of said stationary light;

a detecting unit that receives said light reflected from said object and also receives said light reflected by said reflecting member and outputs a composite detection signal produced by combining both said received lights and with said phase difference reflected therein, said detecting unit further receiving the stationary light reflected by said object by said stationary light and outputting a reflected stationary light detection signal, said detecting unit further receiving the stationary light from said reflecting member and outputting a stationary light detection signal; and a calculating unit that, in accordance with said composite detection signal, said reflected stationary light detection signal and said stationary light detection signal, corrects for a change in reflectance of said object, and calculates said distance.

2. The shape measuring system according to claim 1, wherein said detecting unit comprises:

a detector that is disposed in said predetermined direction and which outputs a detection signal proportional to the intensity of incident light;

two shutter units disposed respectively on an optical path between said object and said detector and an optical path between said reflecting member and said detector and adapted to open and cut off said optical paths by opening and closing motions; and a control unit that makes control to open or close said two shutter units, allowing said composite detection signal, said reflected stationary light detection signal and said stationary light detection signal to be outputted from said detector.

3. The shape measuring system according to claim 2, wherein, in accordance with said composite detection signal, said reflected stationary light detection signal and said detected stationary light signal, said calculating unit corrects at least for one of a change in reflectance of said object and a change in characteristics of an optical system that covers from said light emitting unit to said detecting unit, and calculates said distance.

4. The shape measuring system according to claim 1, wherein said detecting unit comprises:

a detector that is disposed in said predetermined direction and outputs a detection signal proportional to the intensity of incident light;

three shutters disposed respectively on an optical path between said light emitting unit and said object, an optical path between said object and said detector and an optical path between said reflecting member and said detector and adapted to open and cut off said optical paths by opening and closing motions; and a control unit that makes control to open or close said three shutter units, allowing said composite detection signal, said reflected stationary light detection signal and said stationary light detection signal to be outputted from said detector and causing said detector to receive a reflected extraneous light reflected from said object and output a reflected extraneous light detection signal.

5. The shape measuring system according to claim 4, wherein, in accordance with said composite detection signal, said reflected stationary light detection signal, said stationary light detection signal and said reflected extraneous light detection signal, said calculating unit corrects at least for one of a change in reflectance of said object and a change in intensity of said extraneous light, and calculates said distance.

6. The shape measuring system according to claim 4, wherein, in accordance with said composite detection signal, said reflected stationary light detection signal, said stationary light detection signal and said reflected extraneous light detection signal, said calculating unit corrects at least one of a change in reflectance of said object, a change in characteristics of an optical system that covers from said light emitting unit to said detecting unit, and a change in intensity of said extraneous light, and said calculating unit calculates said distance.

7. The shape measuring system according to claim 1, wherein:

said detecting unit outputs, as said composite detection signal with said phase difference reflected therein, an amplitude detection signal indicating the amplitude of a combined light of both said reflected light and said emitted light and also outputs, as said reflected stationary light detection signal, a light quantity detection signal indicating the quantity of said reflected stationary light; and said calculating unit calculates said distance on the basis of said amplitude detection signal and also calculates the luminance of said object on the basis of said light quantity detection signal.

8. The shape measuring system according to claim 1, wherein said detecting unit comprises a detector that outputs a detection signal proportional to the intensity of an incident light, an amplitude detecting circuit that detects the amplitude of said detection signal provided from said detecting unit, a charge storage circuit that integrates, for a predetermined period of time, an output signal provided from said amplitude detecting circuit, a by-pass line that by-passes said amplitude detecting circuit, and a switching unit that switches over said amplitude detecting circuit and said by-pass line from each other.

9. The shape measuring system according to claim 8, wherein said amplitude detecting circuit comprises a high pass filter circuit that eliminates a direct current component from said detection signal provided from said detector and outputs the thus-filtered signal, and a peak holding circuit that detects a peak of the output signal provided from said high pass filter circuit.

10. The shape measuring system according to claim 8, wherein said amplitude detecting circuit comprises a high pass filter circuit that eliminates a direct current component from said detection signal provided from said detector and outputs the thus-filtered signal, and a rectifier circuit that rectifies the output signal provided from said high pass filter circuit.

11. The shape measuring system according to claim 1, wherein said detecting unit comprises a detector that outputs a detection signal proportional to the intensity of an incident light, and an optical filter that selectively transmits a light reflected from said reflecting member or from said object.

12. The shape measuring system according to claim 1, wherein said detecting unit is provided with a common detector that receives light from said object and outputs a detection signal proportional to the intensity of the received light as well as receives light from said reflecting member and outputs a detection signal proportional to the intensity of the received light.

13. The shape measuring system according to claim 1, wherein said detecting unit comprises a first detector that receives light from said object and outputs a detection signal proportional to the intensity of the received light, and a second detector that receives light from said reflecting member and that outputs a detection signal proportional to the intensity of the received light.

14. The shape measuring system according to claim 1, wherein said detecting unit is provided with a plurality of detecting elements that are arranged in a two-dimensional manner and output detection signals proportional to the intensity of an incident light, and said calculating unit calculates distances up to a plurality of points on said object.

15. A shape measuring system wherein a light having been intensity-modulated at a predetermined frequency is emitted toward an object and the distance up to said object is determined on the basis of a phase difference between a reflected light from said object and said emitted light, said shape measuring system comprising:

a light emitting unit that emits said light having been intensity-modulated at said predetermined frequency and emits a stationary light not intensity-modulated toward said object;

a detecting unit that receives said light reflected from said object and also receives the emitted light and then outputs a composite detection signal produced by combining both said received lights and with said phase difference reflected therein, said detecting unit further receiving the stationary light reflected by said object by said stationary light and outputting a reflected stationary light detection signal, said detecting unit further receiving the stationary light and outputting a stationary light detection signal; and a calculating unit that, in accordance with said composite detection signal, said reflected stationary light detection signal and said stationary light detection signal, corrects for a change in reflectance of said object, and calculates said distance.

16. A shape measuring method wherein light having been intensity-modulated at a predetermined frequency is emitted toward an object and the distance up to said object is determined on the basis of a phase difference between reflected light from said object and said emitted light, said shape measuring method comprising:

a first step of emitting said light intensity-modulated at said predetermined frequency toward said object, detecting said reflected light and said emitted light, combining both said lights into a composite detection signal with said phase difference reflected therein, emitting a stationary light not intensity-modulated toward said object, detecting the stationary light reflected from the object, converting the reflected stationary light thus detected into a reflected stationary light detection signal, and detecting said stationary light and converting it into a stationary light detection signal; and a second step of correcting a change in reflectance of said object and calculating said distance, in accordance with said composite detection signal, said reflected stationary light detection signal and said stationary light detection signal.

17. The shape measuring method according to claim 16, wherein, in accordance with said composite detection signal, said reflected stationary light detection signal and said stationary light detection signal, said second step correcting at least one of a change in reflectance of said object and a change in characteristics of an optical system that covers from the emission of light to the detection of light, and said second step calculating said distance.

18. The shape measuring method according to claim 16, wherein said first step detects a reflected extraneous light reflected by said object and converts it into a reflected extraneous light detection signal, and said second step correcting for a change in reflectance of said object and a change in intensity of said extraneous light and calculating said distance, in accordance with said composite detection signal, said reflected stationary light detection signal and said stationary light detection signal.

19. The shape measuring method according to claim 16, wherein said first step detects a reflected extraneous light reflected by said object and converts it into a reflected extraneous light detection signal, and said second step correcting at least one of a change in reflectance of said object, a change in characteristics of an optical system that covers from the emission of light to the detection of light, and a change in intensity of said extraneous light, and said second step calculating said distance, in accordance with said composite detection signal, said reflected light detection signal and said stationary light detection signal.

* * * * *